(12) United States Patent
Dorge et al.

(10) Patent No.: US 6,378,276 B1
(45) Date of Patent: Apr. 30, 2002

(54) BALER WITH A WEIGHING DEVICE

(75) Inventors: Ulrich Dorge, Braunschweig; Dieter Wilkens, Wolfenbüttel-Ahlum, both of (DE)

(73) Assignee: Lely Welger Maschinenfabrik GmbH, Wolfenbüttel (DE)

( * ) Notice: Subject to any disclaimer, the term of this patent is extended or adjusted under 35 U.S.C. 154(b) by 0 days.

(21) Appl. No.: 09/504,395

(22) Filed: Feb. 15, 2000

(30) Foreign Application Priority Data

Feb. 17, 1999 (DE) .......................................... 199 06 611

(51) Int. Cl.$^7$ ................................................. B65B 3/28
(52) U.S. Cl. ............................................ 53/502; 53/588
(58) Field of Search ........................... 53/502, 507, 508, 53/576, 587, 588

(56) References Cited

U.S. PATENT DOCUMENTS

| | | | |
|---|---|---|---|
| 4,172,414 A | * 10/1979 | Klinner et al. .................. | 100/4 |
| 4,742,880 A | * 5/1988 | Schrag et al. ................. | 177/136 |
| 4,961,679 A | * 10/1990 | Van Eecke et al. .......... | 414/111 |
| 5,551,218 A | * 9/1996 | Henderson et al. ........... | 53/504 |

* cited by examiner

*Primary Examiner*—Rinaldi I. Rada
*Assistant Examiner*—Chukwurah Nathaniel
(74) *Attorney, Agent, or Firm*—Sidley Austin Brown & Wood, LLP

(57) ABSTRACT

An agricultural baler including a compression chamber housing, a support axle, springs provided at both sides of the compression chamber housing for supporting the housing on the support axle with a possibility of vertical displacement relative to the support axle, and sensors for determining a distance between the compression chamber housing and the support axle and for generating signals representing in response to sensing the distance a measure of a bale weight.

7 Claims, 1 Drawing Sheet

BALER WITH A WEIGHING DEVICE

BACKGROUND OF THE INVENTION

1. Field of the Invention

The present invention relates to an agricultural baler including a weighing device and a compression chamber housing that is supported on a support axle with a possibility of vertical displacement relative thereto.

2. Description of the Prior Art

U.S. Pat. No. 4,362,097 discloses a round baler in which a wheel arm is pivotally connected to the compression chamber housing by a hydraulic cylinder. The hydraulic cylinder is equipped with a manometer for measuring the pressure. The hydraulic pressure serves as a measurement of weight of a bale in the baler. If the bale weight increases, the compression chamber housing is lowered relative to the support axle which causes run-in of the piston into the cylinder, whereby the hydraulic pressure is increased. The springiness of the compression chamber housing is insured only by the change of the oil volume. This limits the driving speed and causes high oscillation loads. A further drawback of such an arrangement consists in that it is one-sided, which results in imprecise weighing results. In addition, no device is provided which would correct false weighing results caused by transverse or longitudinal tilt of the baler. With a wide use of rented balers, even today, the number of compressed bales dominates the accounting basis for a farmer, renter and/or customer. For sound calculation, the exact knowledge of the bale weight is of a primary importance. Often, the bales are loaded on a transporting vehicle directly on the field. Here, the knowledge of the exact weight of bales is also very important, in particular, in order to prevent overloading.

Accordingly, an object of the present invention is to provide a baler with an increased precision of bale weighing.

Another object of the present invention is to provide a baler in which the measured bale weight is used for controlling different baler functions which permit to obtain, during the bale formation, pre-adjusted, reproducible bale weights.

SUMMARY OF THE INVENTION

These and other objects of the present invention, which will become apparent hereinafter, are achieved by providing springs at both sides of the compression chamber housing for supporting same on the support axle with a possibility of vertical displacement relative to the support axle, and sensor means for determining a distance between the compression chamber housing and the support axle, with the signals generated in response to sensing the distance representing a measure of a bale weight.

The baler according to the present invention is characterized by a simplicity of constructions, with the spring deflection of the baler serving for measuring the bale weight. In practice, the displacement measurement of the relative position of the compression chamber housing with respect to the support axle unexpectedly produced results that permit to evaluate how the displacement of the housing with respect to the support axle changes with time during which the bale is formed. Despite different disturbance variable, a steady increase of the measurement value takes place with the increase of bale weight. That permitted to achieve a precision of bale weighing of about 2%. The present invention is particularly advantageous for round balers because the gravity center direction does not change with the increase of the bale weight, so that no load sensors on the drawbar are needed.

According to a further development of the present invention the sensor means is formed of two displacement sensors arranged on the support axle in a spaced relationship to each other and selected from a group consisting of inductive distance sensors with a solenoid plunger, inductive analogue sensors, capacitance analogue sensors, potentiometric displacement sensors, path scanners, cable controlled displacement sensors.

In this case, practically, each wheel is associated with a corresponding displacement sensor. If the empty weight of the baler is set as a nil value of the weighing device, the mean value of both measured displacement variables obtained in the evaluation device produces directly a bale weight in a corresponding output device.

According to a further development of the present invention, there is provided an inclination sensor for determining inclination of the baler which produces a false weight measurement. The inclination sensor is connected with the evaluation device. This permits to obtain, because of corresponding correction coefficients contained in the evaluation device, an actual bale weight despite the longitudinal and/or transverse tilt of the baler.

In order to be able to utilize the present invention also in piston balers in which the center of gravity is displaced with increase of the bale weight, there is provided a sensor for sensing the drawbar supporting force acting on the baler and connected with the evaluation device. Thereby, the drawbar supporting force is taken into account in determining the bale weight.

An operator-friendly, constant and reproducible bale weighing can be achieved automatically in a baler with a constant cylindrical compression chamber for producing round bales when the actuation of a twine or net enveloping device dependent on the bale weight is effected directly or indirectly, by the weighing device upon the compression chamber housing being displaced by an amount corresponding to a desired pre-adjusted bale weight.

The provision of a displacement sensor on each side of the baler permitted to provide a particularly simple bale shape displaying device that shows, dependent of the deflections of each side of the compression chamber housing measured by a respective sensor, a non-uniform filling of the compression chamber in its side regions.

In response to this showing, the operator can take measures which would insure a uniform filling of the chamber.

According to a further embodiment of the present invention, there is provided an evaluation device connected with the sensor means and a device for determining an actual geographical position of the baler and connected with the global positioning system, with the actual position determining device being connected with the evaluation device for communicating thereto signals indicative of position data corresponding to actual bale weights during formation of a bale. There is further provided electronic memory means connected with the evaluation device. The evaluation device converting the received data, which indicate allocation of weight values of pick-up goods to respective positions of the baler, into digital yield mapping, with the mapped data being stored in the memory means for an electronic display and/or evaluation. The foregoing arrangement is particular suitable for yield mapping which is particularly useful in production of silage and/or formation of hay bales.

Because weighing can be conducted both during the formation of a bale, dynamic measurement, and during the stoppage of the baler, stationary measurement, the present invention provides for an automatic control of the weighing process. The research and experiments have shown that both the dynamic measurement and the stationary measurement give approximately identical results.

The present invention provides a baler with a spring-supported compression chamber housing which can operate at a speed above 50 km/hr, has simple means for measuring the weight-rendering spring deflection, insures an operator's comfort, and provides means for connection of the weight measuring means with the global positioning system.

According to the invention, the same advantages are achieved when instead of measuring the displacement of the compression chamber housing, the frequency change of the oscillation system of the baler (springs/mass system) is measured. The frequency change likewise represents a measure of a bale weight. This is because the frequency changes with changing of the bale weight. Because the natural frequency of, e.g., round baler remains substantially constant during operation of the baler, the measurement of the frequency change permits to obtain suitable weight results.

The novel features of the present invention, which are considered as characteristic for the invention, are set forth in the appended claims, The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE REFERRED EMBODIMENTS

Figure 1:
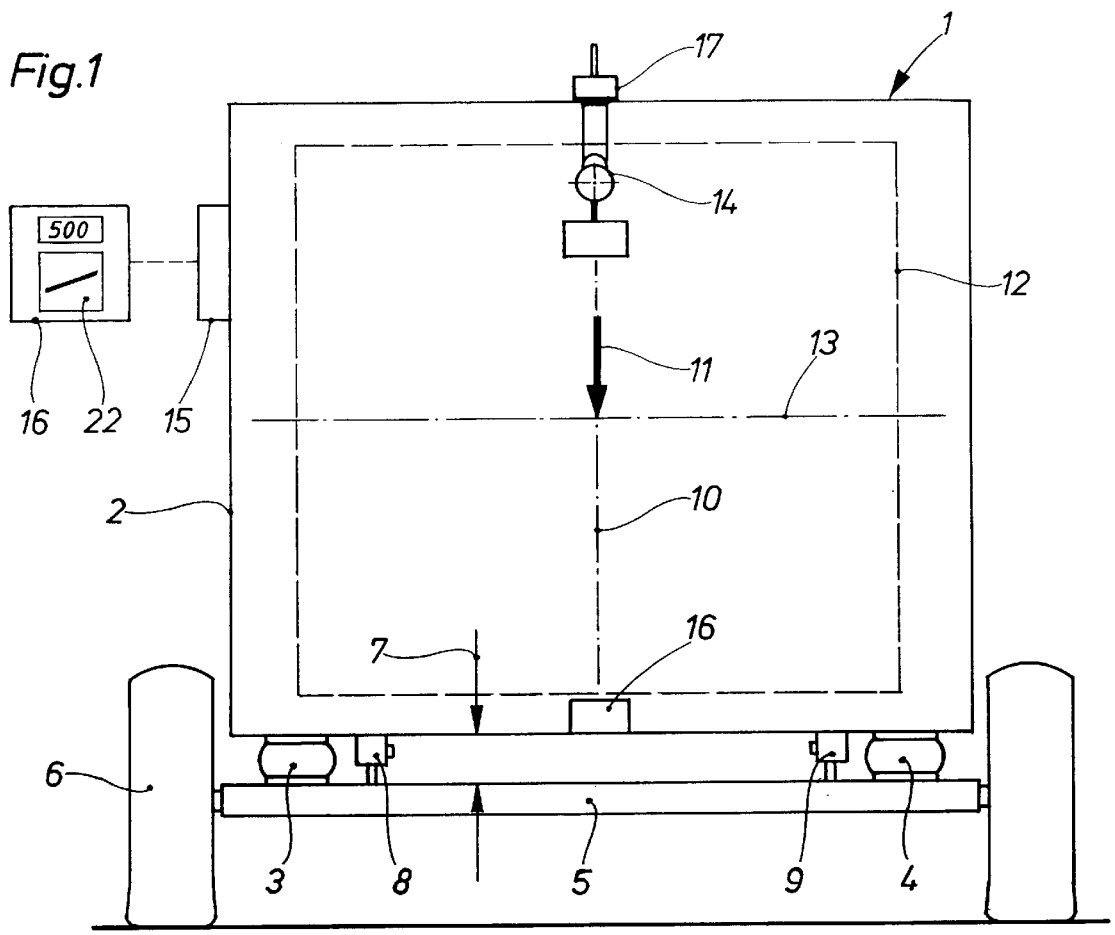
FIG. 1 a rear view of a compression chamber housing, which is supported on a support axle, of a round baler according to the present invention.

FIG. 1 shows a round baler 1 that essentially consists of a compression chamber housing 2 with a variable or constant compression chamber for producing cylindrical compressed bales, and of a drawbar, not shown, for connecting the baler to a tractor, likewise not shown.

The compression chamber housing 2 is supported with two rubber springs 3 and 4 on a support axles 5 provided at its opposite ends with wheels 6. Upon filling of the round baler 1, the distance 7 between the compression chamber housing 2 and the support axle 5 is reduced dependent on the weight of the harvest filling the baler 1. The distance corresponding to the spring deflection is sensed by displacement sensors 8 and 9 the signals of which are used for displaying the bale weight. The sensors 8 and 9 are arranged symmetrically with respect to a vertical longitudinal central plane 10 and adjacent to respective rubber springs 3 and 4.

By evaluating the change in distances at separate sensors 8 and 9, the non-uniformity of the bale shape can be shown in a particularly simple manner. This non-uniformity may be caused by one-sided filling of the round baler 1.

In a horizontal position of the round baler 1, a vertically downward directed weight 11 of a round bale 12, which has a cylinder center axis 13 and which is shown in FIG. 1 with dash lines, is applied at the baler gravity center. In order to correct the false weight measurement of a bale, which may be caused by a longitudinal and/or transverse tilt of the baler, there is provided a gimbal-mounted pendulum 14. The round baler 1 can also be provided with a longitudinal and/or transverse tilt sensor, not shown, or inclinometer. Both displacement sensors 8 and 9 and the pendulum 14 are operatively connected with an electronic evaluation unit 15 that processes signals from the displacement sensors 8 and 9 and the pendulum 14 and transmits the bale weight to an output unit 16, which displays or stores the data, and/or a control device 17 which controls different baler functions, in particularly, a tying device, not shown. Further, a moisture sensor 18 for harvest goods can be connected with the evaluation unit 15 for an automatic conversion of the picked-up goods into weight of the dry mass of a bale. Further, the evaluation unit 15 can be connected with a GPS satellite navigation receiver 19 for determining respective geographical positions of the round baler 1 during the bale formation and for converting the obtained data into digital yield mapping for displaying and/or storing the data on a yield card 20 or a bale position card.

Figure 2:
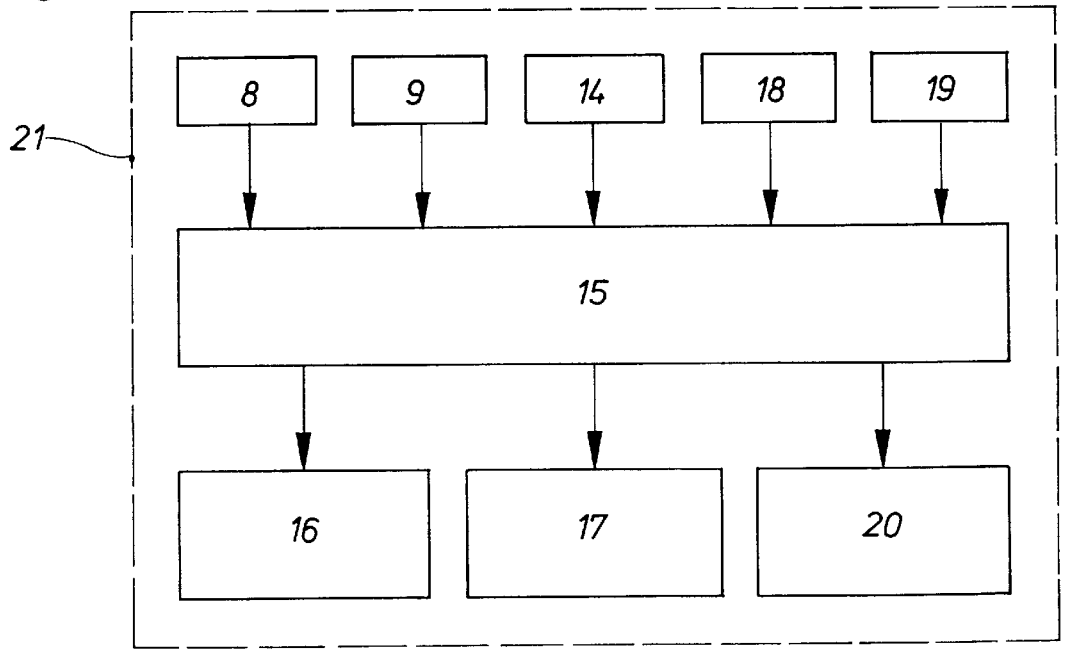
FIG. 2 a block diagram of a weighing device with an evaluation unit.

FIG. 2 shows a block diagram of an advantageous embodiment of a weighing device generally designated with a reference numeral 21. Generally, the two displacement sensors 8 and 9, the tilt or inclination sensor (pendulum 14) which functions as a correction determining device, the moisture sensor 16, and the global positioning system antenna 17 are all located on the baler 1 and communicate respective signals to the evaluation unit 15. The evaluation unit 15 or the output units 16, 17 can be pre-adjusted by available input means, not shown, e.g., based on set values for the bale weight. Upon feeding of the goods, the evaluation device 15 provides, based on the input signals, a respective bale weight, the weight of the dry mass, the bale shape, the number of bales or the yield/strokes, and the amount of the pick-up goods in a definite position and/or electronically stored locations of deposited bales for subsequent handling of the bales. The foregoing data are transmitted to the output device or unit 16, such as video display, printer, electronic memory or the control device 17 that controls the operation of the baler 1. The weighing device 21 is particularly suitable for balers with a constant volume compression chamber because, in this case, an optimal bale weight for loading of trucks can be pre-adjusted, which also can be achieved by an automatic weight-dependent actuation of a tying device. Advantageously, obtaining of an exact cylindrical shape of bales can be achieved by weight-dependent sensing of the side filling of the baler 1 because this permits the operator to undertake the necessary control measures rather early. According to the invention, the same advantages can also be achieved when instead of the displacement changes, the frequency changes of the oscillation system are communicated which also depend on the bale weight.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An agricultural baler, comprising a compression chamber housing; a support axle; springs provided at both sides of the compression chamber housing for supporting the compression chamber housing on the support axle with a possibility of vertical displacement of the compression chamber housing relative to the support axle; and sensor means for determining a distance between the compression chamber housing and the support axle and for generating signals representing a measure of a bale weight, wherein the sensor means comprises two displacement sensors arranged on the support axle in a spaced relationship to each other and selected from a group consisting of inductive distance sensors with a solenoid plunger, inductive analogue sensors, capacitance analogue sensors, potentiometric displacement sensors, path scanners, cable controlled displacement sensors.

2. A baler as set forth in claim 1, further comprising an evaluation device including an output unit formed as at least one of a weight video display and a printer, the displacement sensors being connected with the evaluation unit.

3. A baler as set forth in claim 2, further comprising an inclination sensor for determining inclination of the baler, which causes a false weight measurement, and connected with the evaluation device.

4. A baler as set forth in claim 3, wherein the inclination sensor comprise a gimbal-mounted pendulum an inclination of which with respect one of a vertical line and an axis extending at a predetermined angle to the vertical line serves as a measurement of a magnitude of a to-be-undertaken correction.

5. A baler as set forth in claim 2, further comprising a moisture sensor connected with the evaluation device, signal generated by the moisture sensor serving for converting harvest good mass into a weight of a dry mass.

6. A baler as set forth in claim 1, further comprising a bale shape display device that displays, in accordance with spring deflections of the compression chamber housing at each side of the housing as measured by the displacement sensors, a non-uniform filling of the compression chamber in side regions of the compression chamber.

7. An agricultural baler, comprising a compression chamber housing; a support axle; springs provided at both sides of the compression chamber housing for supporting the compression chamber axle on the support axle with a possibility of vertical displacement of the compression chamber axle relative to the support axle; sensor means for determining a distance between the compression chamber housing and support axle and for generating signals representing a measure of a bale weight; and an evaluation device connected with the sensor means; a device for determining an actual geographical position of the baler and connected with a global positioning system, the actual position determining device being connected with the evaluation device for communicating thereto signals indicative of position data corresponding to actual bale weights during formation of a bale; and electronic memory means connected with the evaluation device, the evaluation device converting the received data, which indicate allocation of weight values of pick-up goods to respective positions of the baler, into digital yield mapping, with the mapped data being stored in the memory means for at least one of the electronic display and evaluation.

* * * * *